United States Patent
Engbersen et al.

(10) Patent No.: US 10,272,999 B2
(45) Date of Patent: Apr. 30, 2019

(54) TAIL-SITTER AIRCRAFT WITH LEGGED UNDERCARRIAGE FOLDABLE TO FORM REAR FUSELAGE

(71) Applicant: Aerovel Corporation, Bingen, WA (US)

(72) Inventors: Rutger Engbersen, Hood River, OR (US); Brian T. McGeer, Underwood, WA (US); Michael Baxter, Hood River, OR (US)

(73) Assignee: Aerovel Corporation, Bingen, WA (US)

( * ) Notice: Subject to any disclaimer, the term of this patent is extended or adjusted under 35 U.S.C. 154(b) by 315 days.

(21) Appl. No.: 15/373,085

(22) Filed: Dec. 8, 2016

(65) Prior Publication Data

US 2017/0166306 A1   Jun. 15, 2017

Related U.S. Application Data

(60) Provisional application No. 62/267,648, filed on Dec. 15, 2015.

(51) Int. Cl.
*B64C 29/02* (2006.01)
*B64C 25/52* (2006.01)
*B64C 39/02* (2006.01)

(52) U.S. Cl.
CPC .............. *B64C 29/02* (2013.01); *B64C 25/52* (2013.01); *B64C 39/024* (2013.01); *B64C 2201/104* (2013.01); *B64C 2201/165* (2013.01); *B64C 2201/18* (2013.01)

(58) Field of Classification Search
CPC ....... B64C 29/02; B64C 25/40; B64C 39/024; B64C 2201/18

USPC ............................................. 244/109
See application file for complete search history.

(56) References Cited

U.S. PATENT DOCUMENTS

| | | | |
|---|---|---|---|
| 2,622,826 A | * 12/1952 | Prince | B64C 29/02 244/17.21 |
| 3,142,455 A | * 7/1964 | Burke | B64C 29/02 244/7 B |
| 3,881,671 A | 5/1975 | Bouchnik | |
| 3,966,142 A | 6/1976 | Corbett et al. | |
| 4,106,727 A | 8/1978 | Ortell | |

(Continued)

FOREIGN PATENT DOCUMENTS

| | | | |
|---|---|---|---|
| DE | 102016120671 A1 | * 5/2018 | ............ B64C 11/48 |
| WO | WO-2016013933 A1 | * 1/2016 | ............ B64C 39/024 |
| WO | WO-2016209350 A2 | * 12/2016 | ............ B64C 25/10 |

OTHER PUBLICATIONS

Automated Launch, Recovery, and Refueling for Small Unmanned Aerial Vehicles, K. Mullens et al., 2004 (11 pp).

(Continued)

*Primary Examiner* — Christopher P Ellis
(74) *Attorney, Agent, or Firm* — Neal, Gerber & Eisenberg LLP

(57) ABSTRACT

Various embodiments of the present disclosure provide a tail-sitter aircraft having a leg assembly convertible from landing gear into a rear fuselage and empennage (or a tail assembly) of the aircraft. Generally, the leg assembly includes multiple legs movable from a closed configuration in which the legs form the tail assembly of the tail-sitter aircraft to an open configuration in which the legs form the landing gear of the tail-sitter aircraft (and vice-versa).

20 Claims, 22 Drawing Sheets

(56) References Cited

U.S. PATENT DOCUMENTS

| | | | |
|---|---|---|---|
| 5,056,737 A | 10/1991 | Taylor | |
| 5,062,587 A * | 11/1991 | Wernicke | B64C 25/04 244/100 R |
| 5,086,993 A | 2/1992 | Wainfan | |
| 5,295,643 A | 3/1994 | Ebben et al. | |
| 5,395,073 A * | 3/1995 | Rutan | B64C 3/385 244/38 |
| 5,836,541 A | 11/1998 | Pham | |
| 6,392,213 B1 | 5/2002 | Martorana et al. | |
| 6,561,455 B2 * | 5/2003 | Capanna | B64C 29/02 244/7 A |
| 8,167,234 B1 * | 5/2012 | Moore | B64C 37/00 244/17.23 |
| 8,342,440 B2 * | 1/2013 | Papanikolopoulos | A63H 27/12 244/17.11 |
| 8,505,846 B1 | 8/2013 | Sanders, II | |
| 8,888,035 B2 | 11/2014 | Lind, Jr. et al. | |
| 8,930,044 B1 * | 1/2015 | Peeters | B64C 19/00 701/2 |
| 9,550,567 B1 * | 1/2017 | Erdozain, Jr. | B64C 29/02 |
| 2004/0151347 A1 * | 8/2004 | Wisniewski | G06K 9/00221 382/115 |
| 2010/0252690 A1 * | 10/2010 | Hothi | B64C 39/024 244/7 B |
| 2012/0097801 A1 * | 4/2012 | Barrett | B64C 27/24 244/7 A |
| 2015/0148988 A1 * | 5/2015 | Fleck | G05D 1/0011 701/2 |
| 2016/0159468 A1 * | 6/2016 | Harris, III | B64C 25/14 244/102 R |
| 2016/0378120 A1 * | 12/2016 | Creasman | B64C 3/546 701/2 |
| 2017/0097644 A1 * | 4/2017 | Fegely | G05D 1/0676 |
| 2017/0190412 A1 * | 7/2017 | Bunting | B64D 45/04 |
| 2017/0283052 A1 * | 10/2017 | Moshe | B64C 3/38 |
| 2018/0050792 A1 * | 2/2018 | Robertson | B64C 25/16 |
| 2018/0118334 A1 * | 5/2018 | Stamps | B64C 11/28 |
| 2018/0186445 A1 * | 7/2018 | Fenny | B64C 27/08 |
| 2018/0244383 A1 * | 8/2018 | Valente | B64C 15/12 |
| 2018/0290743 A1 * | 10/2018 | Vorsin | B60L 11/182 |

OTHER PUBLICATIONS

Flexrotor Long-Endurance VTOL Aircraft Transitions to Wing-Borne Flight, Aug. 4, 2011 (2 pages).

Mini-RPV Recovery System Conceptual Study, Prepared for Eustis Directorate U.S. Army Air Mobility Research and Development Laboratory, Aug. 1977 (322 pages).

* cited by examiner

US 10,272,999 B2

TAIL-SITTER AIRCRAFT WITH LEGGED UNDERCARRIAGE FOLDABLE TO FORM REAR FUSELAGE

PRIORITY CLAIM

This patent application claims priority to and the benefit of U.S. Provisional Patent Application No. 62/267,648, which was filed on Dec. 15, 2015, the entire contents of which are incorporated herein by reference.

BACKGROUND

Tail-sitter aircraft typically land by gently descending in free thrust-borne flight onto a landing surface and coming to rest on landing gear, such as an undercarriage of wheels, skids, or legs. There is a continuing need for tail-sitter undercarriages with improvements in weight, drag, and mechanical simplicity.

SUMMARY

Various embodiments of the present disclosure provide a legged undercarriage or leg assembly that folds to form the rear fuselage and empennage (or tail assembly) of a tail-sitter aircraft. Generally, the legged undercarriage or leg assembly includes multiple legs movable from a first or closed configuration in which the legs form the rear fuselage and empennage (or tail assembly) of the tail-sitter aircraft to a second or open configuration in which the legs form the landing gear of the tail-sitter aircraft.

In preparation for launch, the aircraft's legs are moved to the open configuration and the aircraft is positioned on a suitable launch surface, such as the deck of a ship at sea, such that the nose of the aircraft points upward and the legs rest on the launch surface. The legs and the foreshortened fuselage support and stabilize the aircraft in this orientation. The aircraft's engine is started, and the aircraft is controlled to climb in thrust-borne flight. The aircraft's legs then move to the closed configuration to form the rear fuselage and empennage (or tail assembly) of the aircraft and are locked together. The aircraft can then transition into wing-borne flight.

To land, the aircraft transitions from wing-borne flight to thrust-borne flight and begins descending. The aircraft's legs are then unlocked from one another and move to the open configuration to form landing gear. The aircraft then descends until the legs and foreshortened fuselage contact a suitable landing surface, at which point the aircraft's engine is shut down.

DETAILED DESCRIPTION

1. Components

Figure 1A:
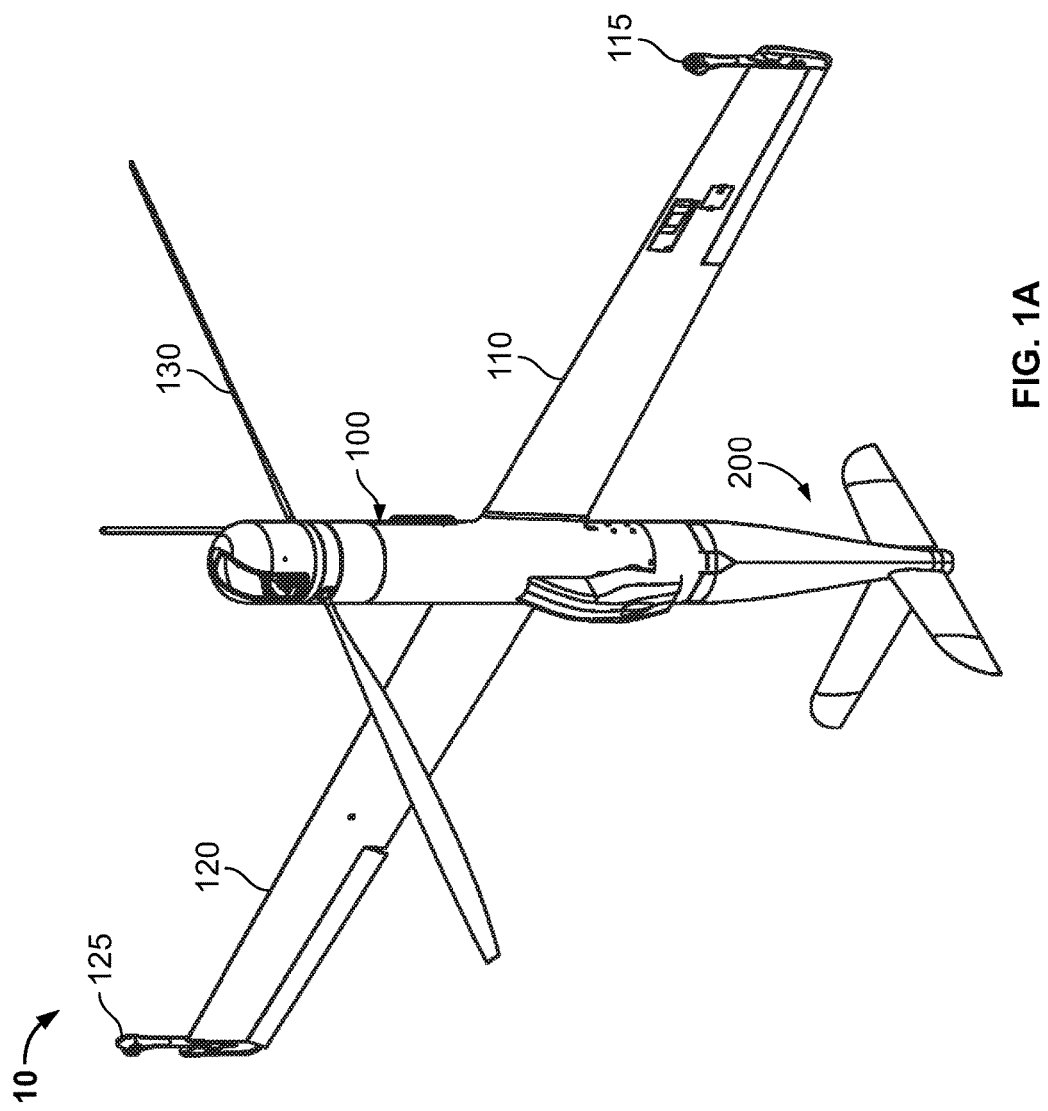
FIGS. 1A, 1B, 1C, and 1D show perspective views of one example embodiment of the tail-sitter aircraft of the present disclosure with its legs in the closed configuration.
Figure 1B:
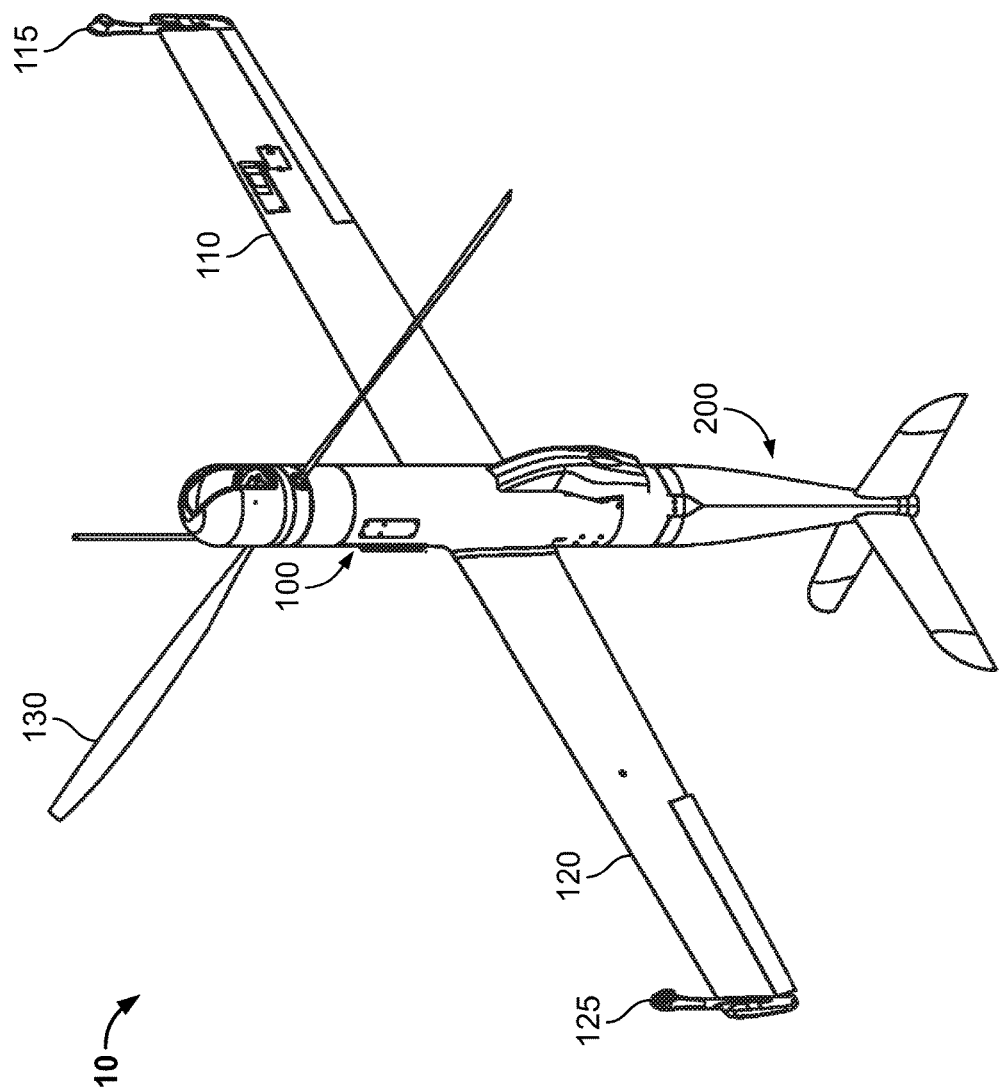
Figure 1C:
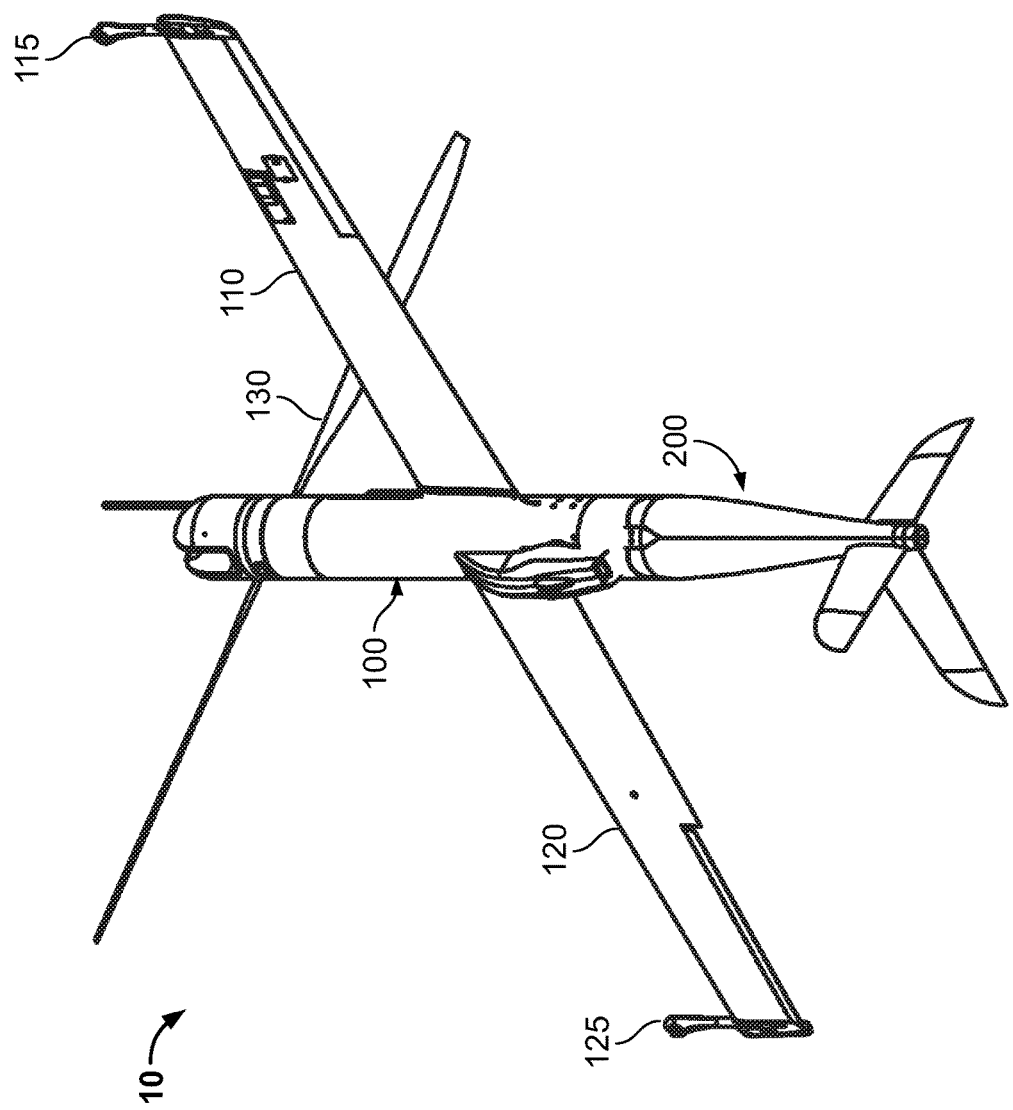
Figure 1D:
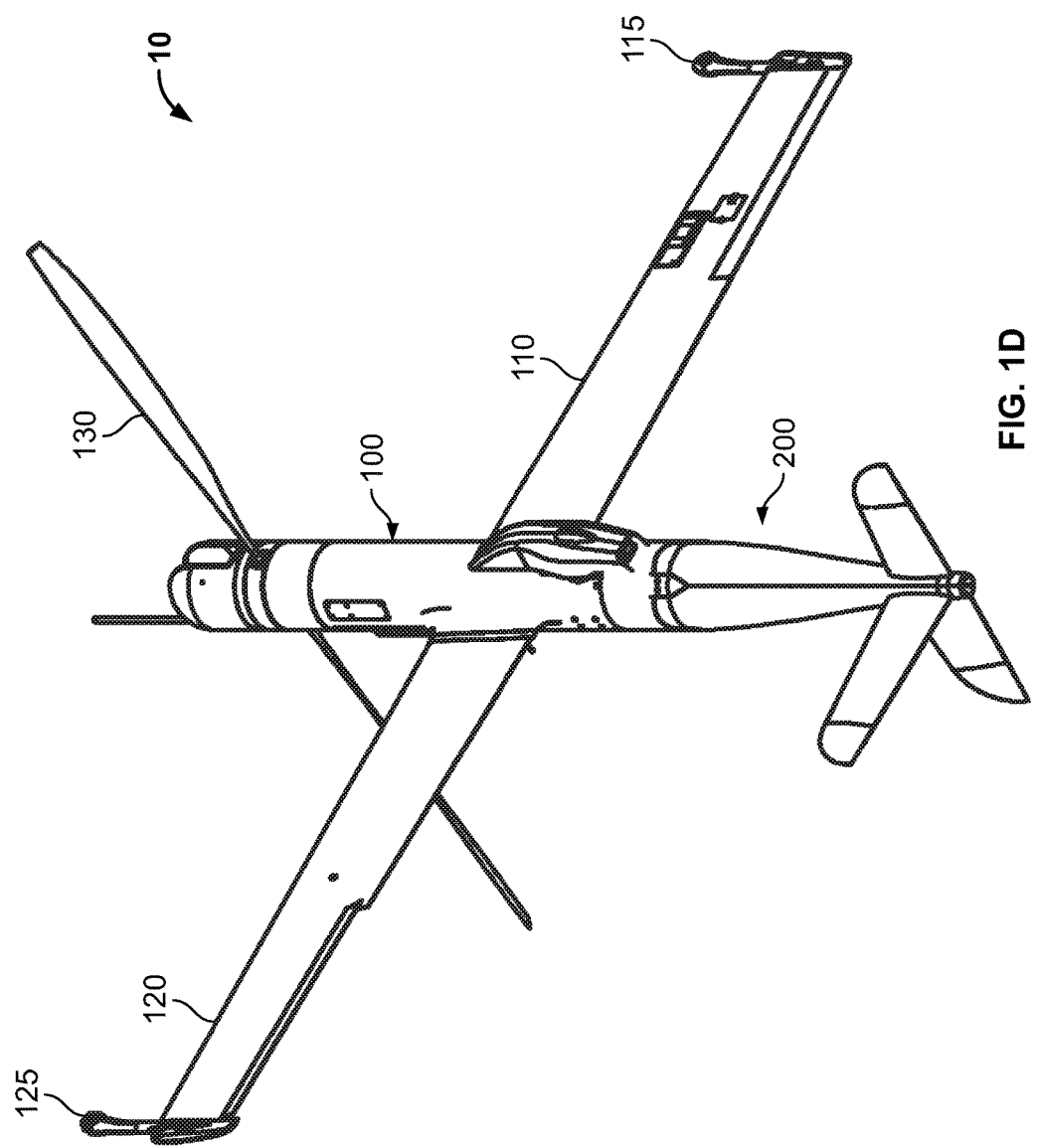
Figure 1E:
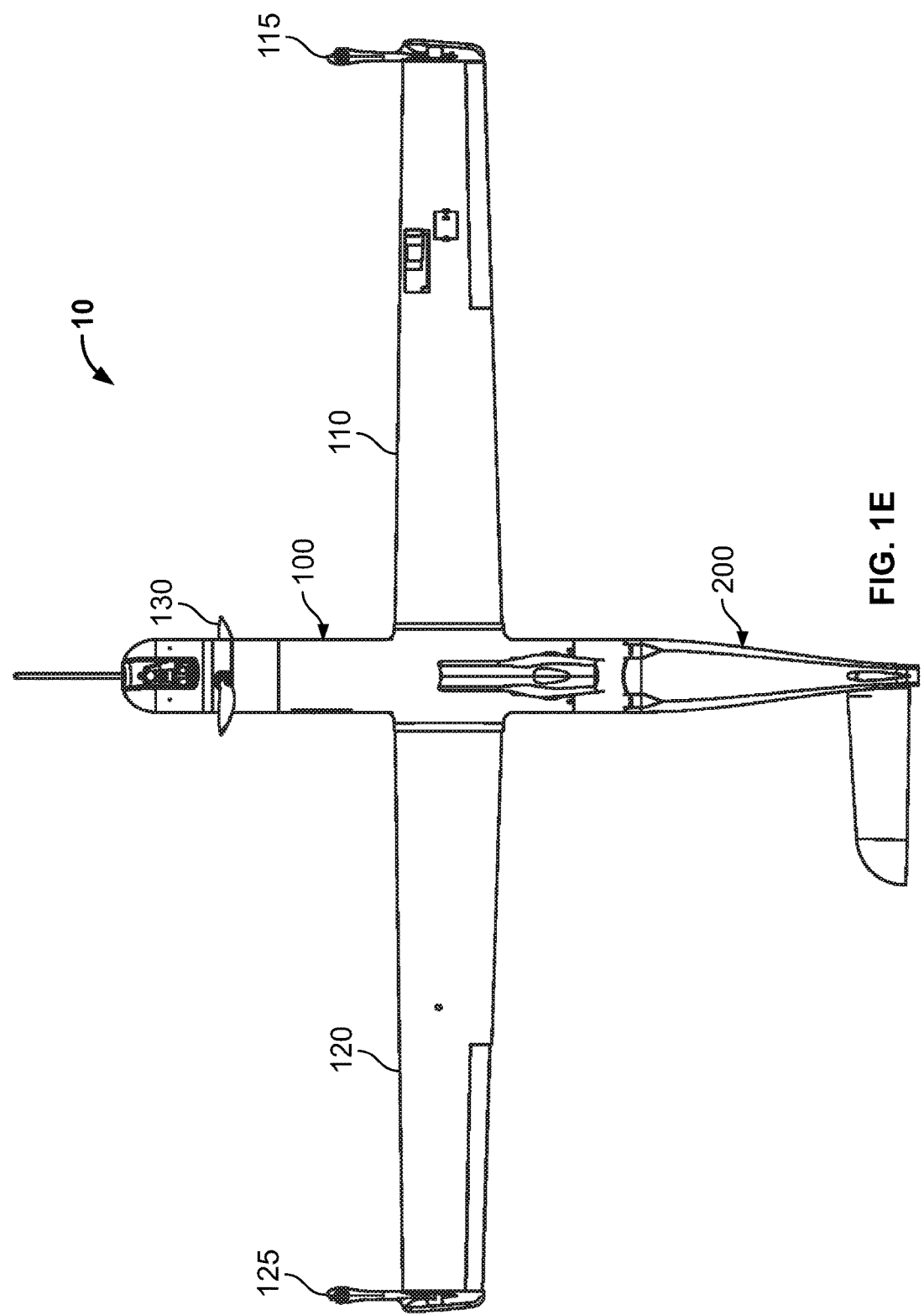
FIGS. 1E and 1F show a top and bottom plan views, respectively, of the tail-sitter aircraft of FIGS. 1A to 1D with its legs in the closed configuration.
Figure 1F:
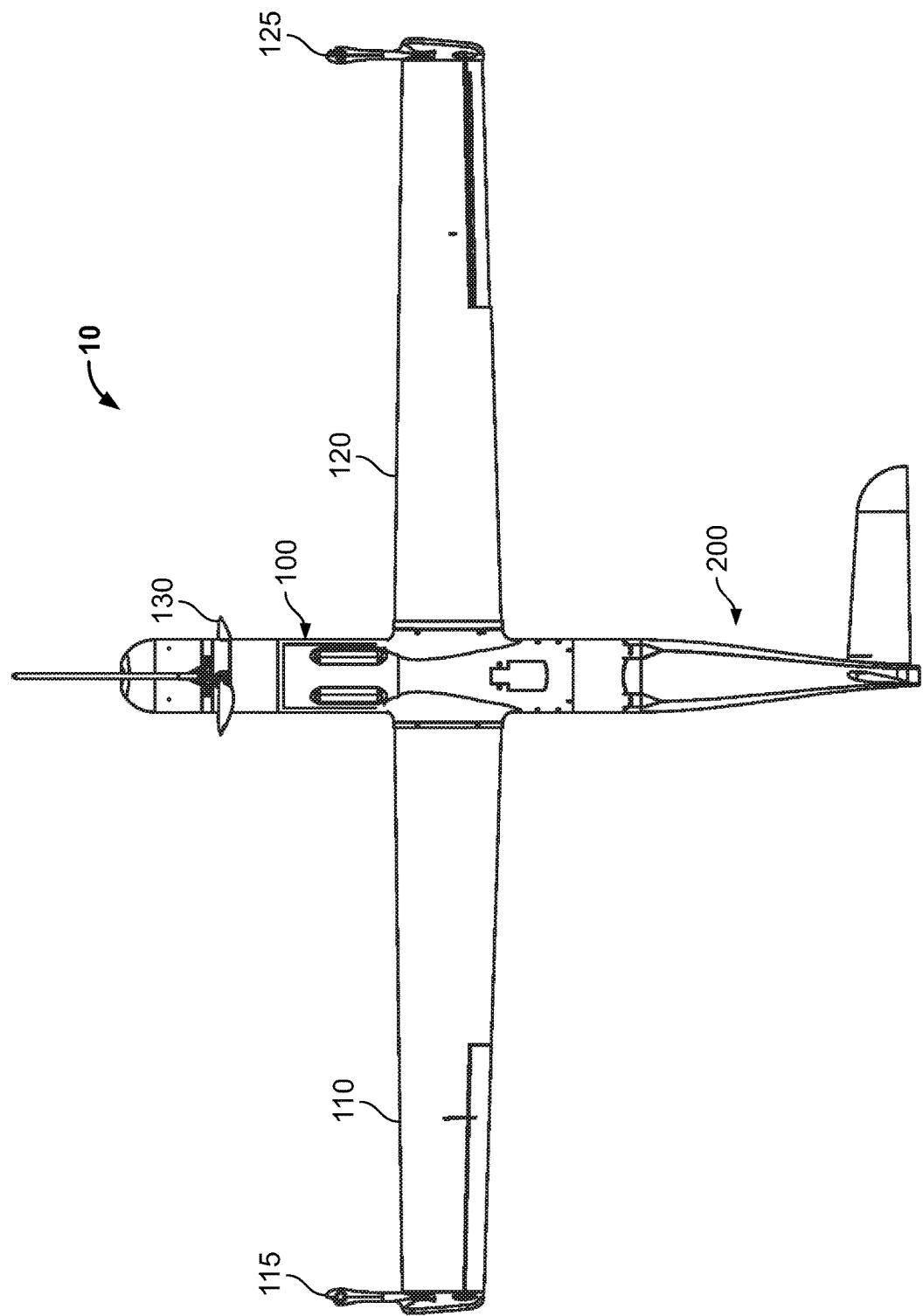
Figure 1G:
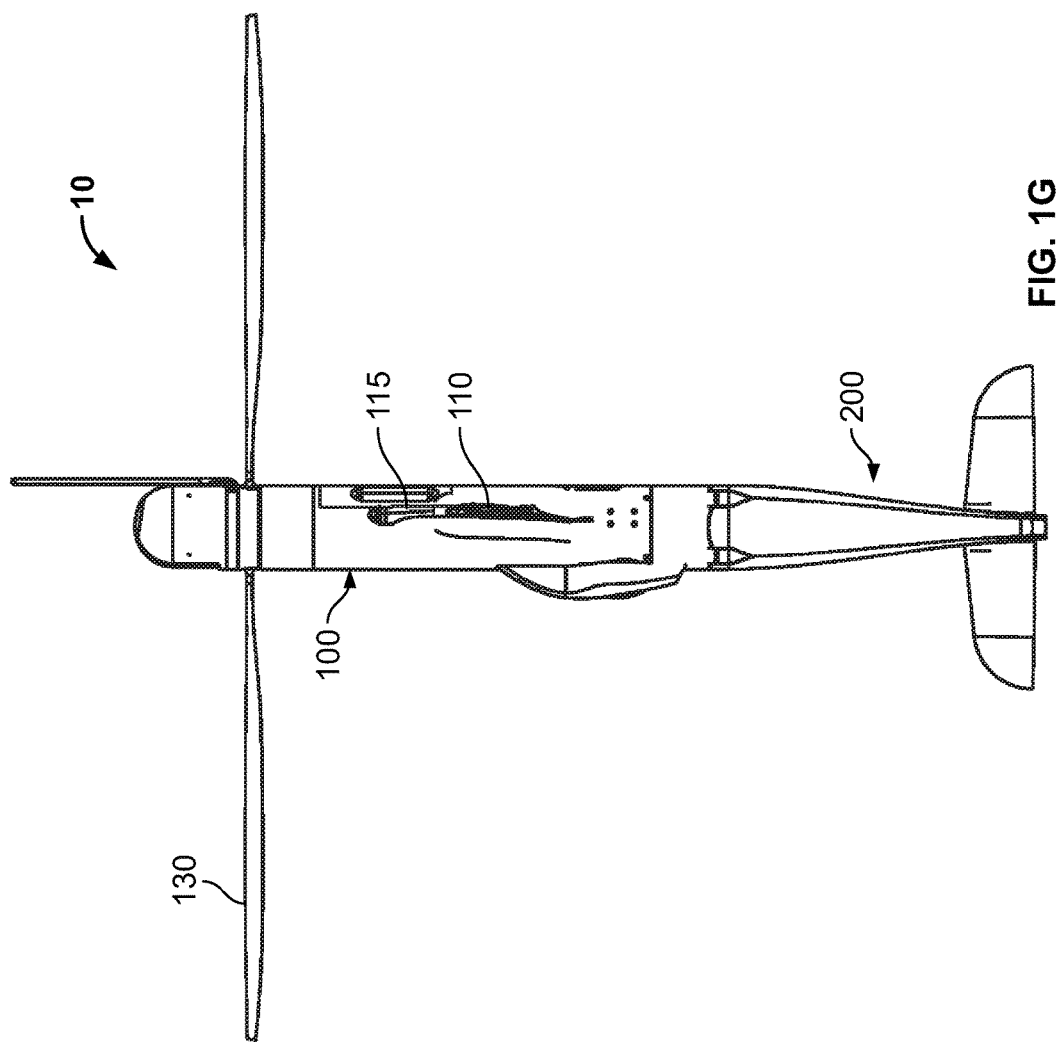
FIG. 1G shows a side elevational view of the tail-sitter aircraft of FIGS. 1A to 1D with its legs in the closed configuration.
Figure 2A:
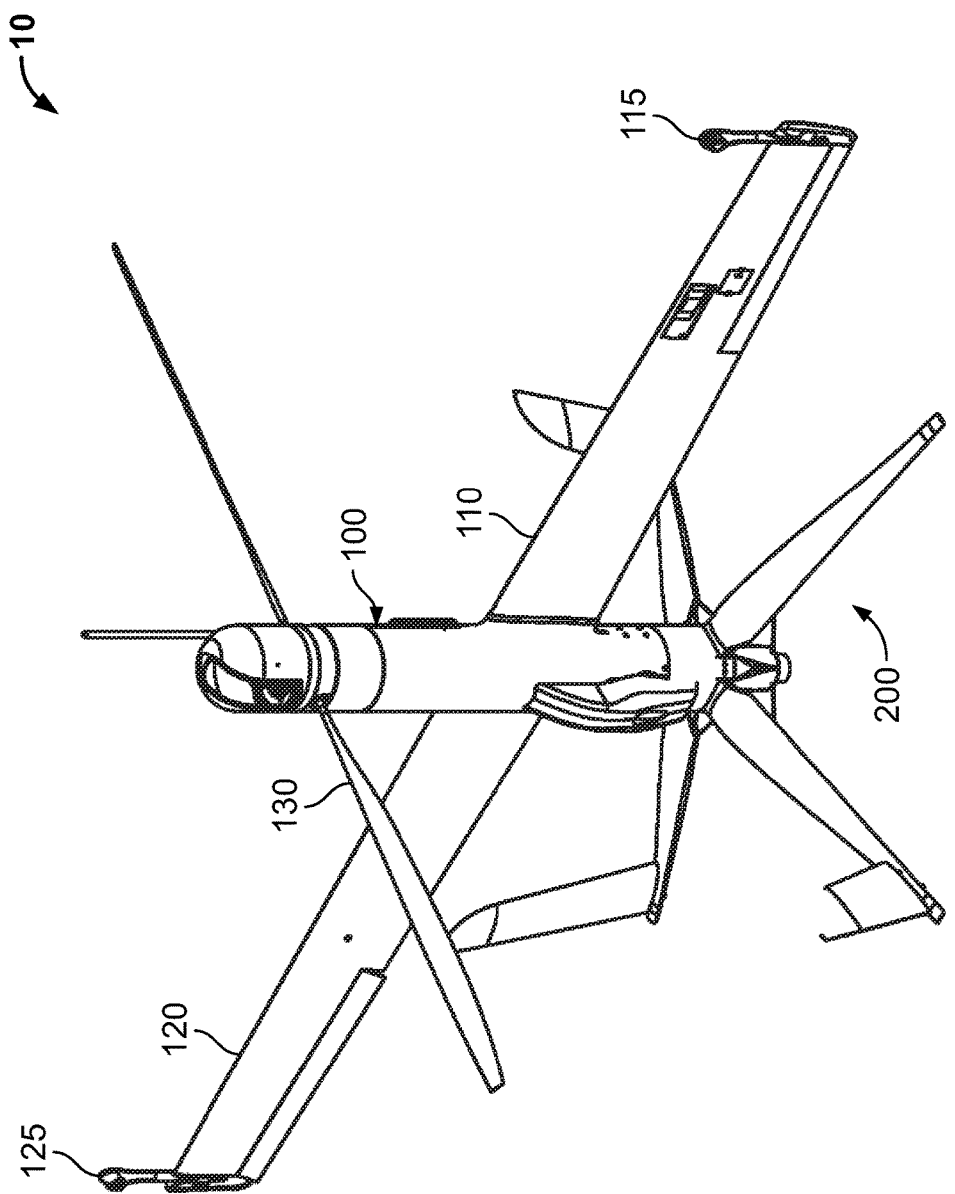
FIGS. 2A, 2B, 2C, and 2D show perspective views of one example embodiment of the tail-sitter aircraft of FIGS. 1A to 1G with its legs in the open configuration.
Figure 2B:
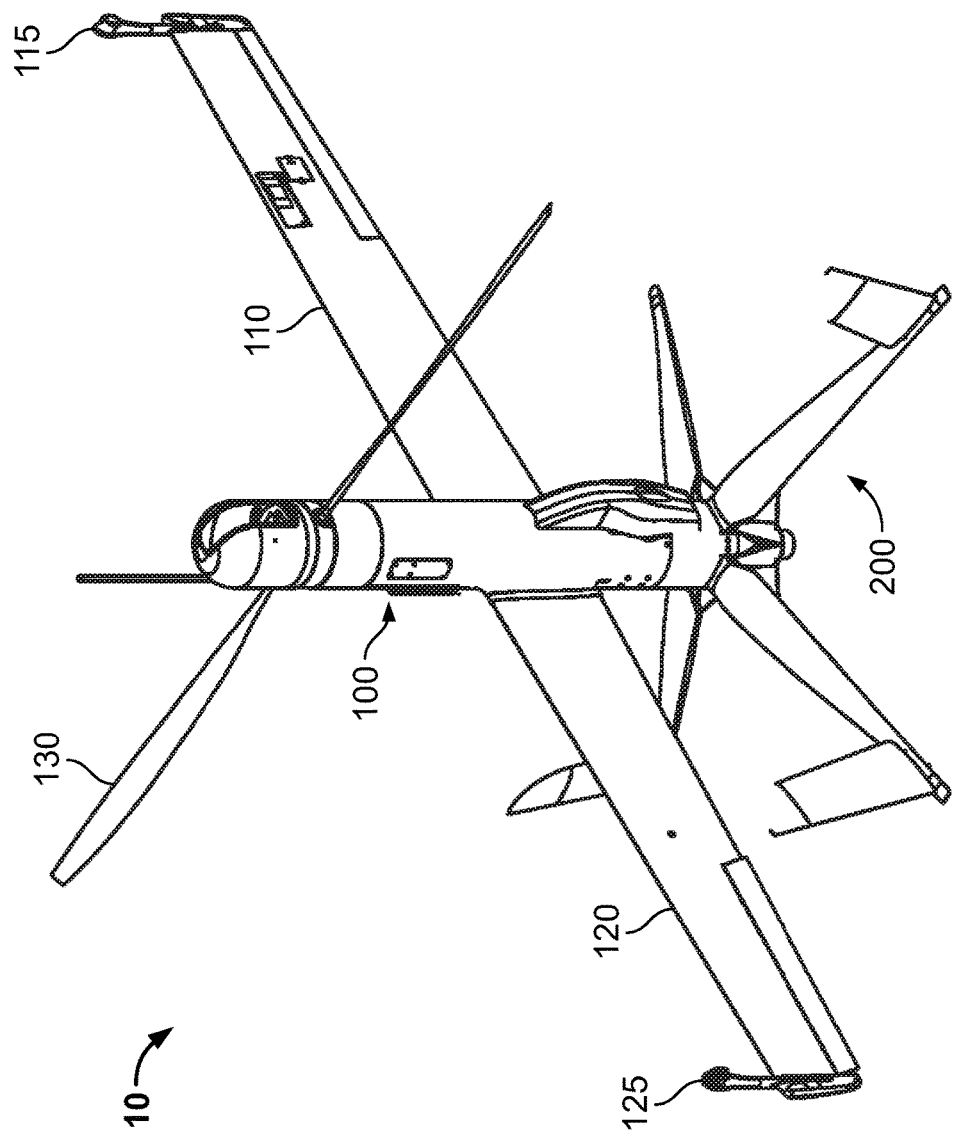
Figure 2C:
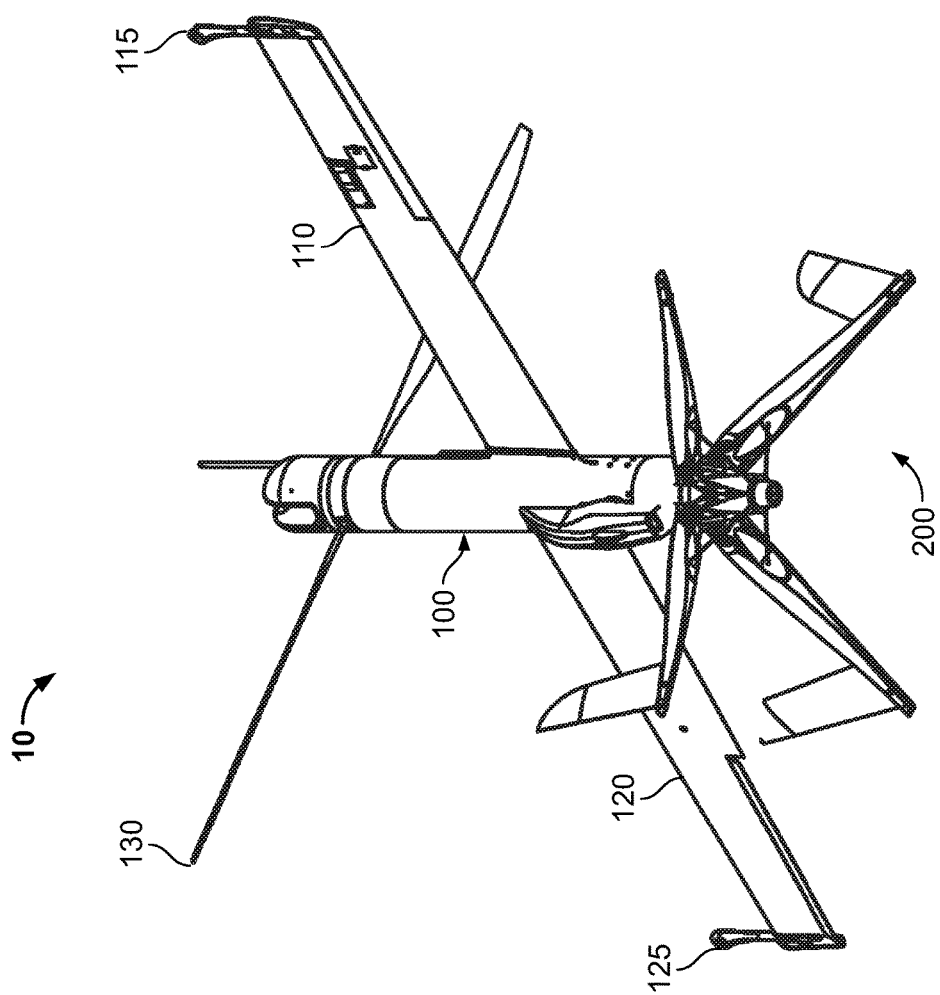
Figure 2D:
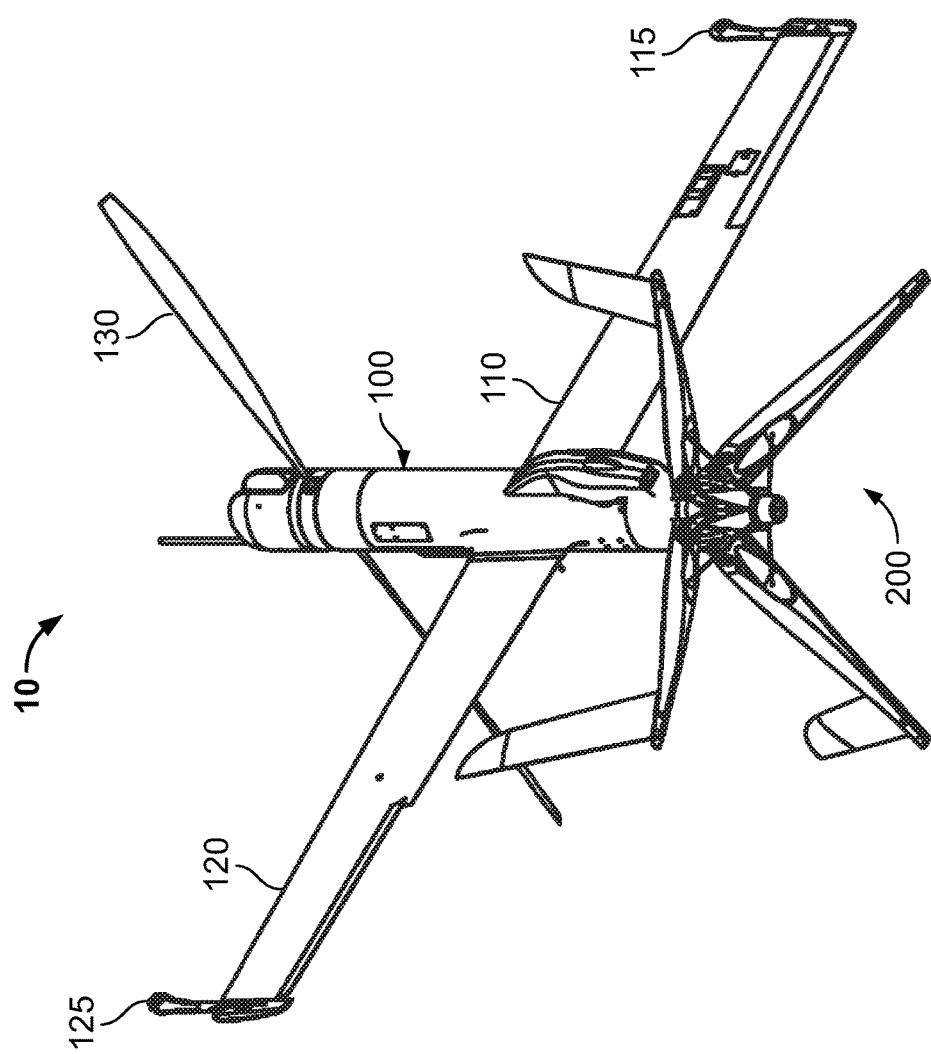
Figure 2E:
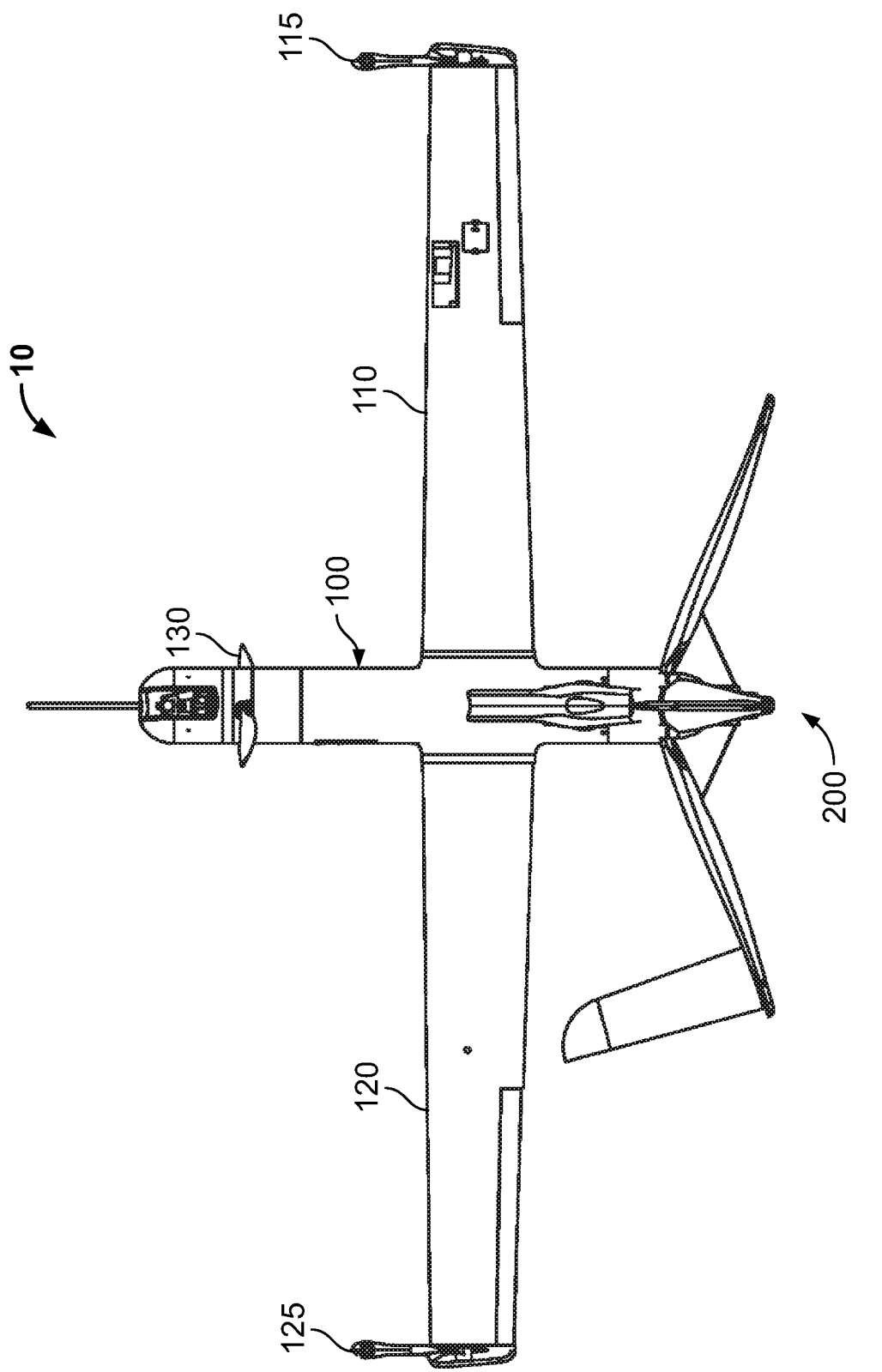
FIGS. 2E and 2F show a top and bottom plan views, respectively, of the tail-sitter aircraft of FIGS. 2A to 2D with its legs in the open configuration.
Figure 2F:
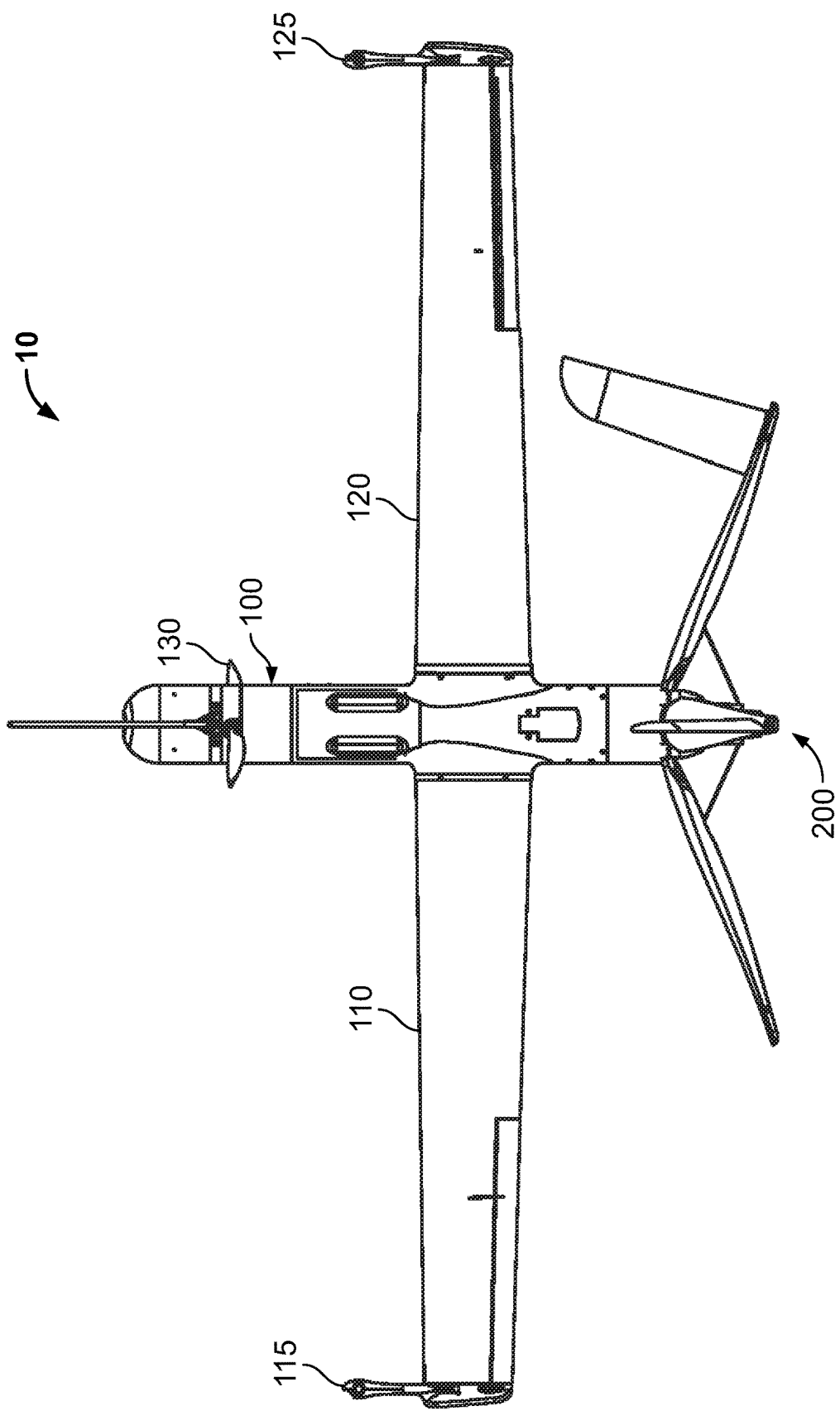
Figure 2G:
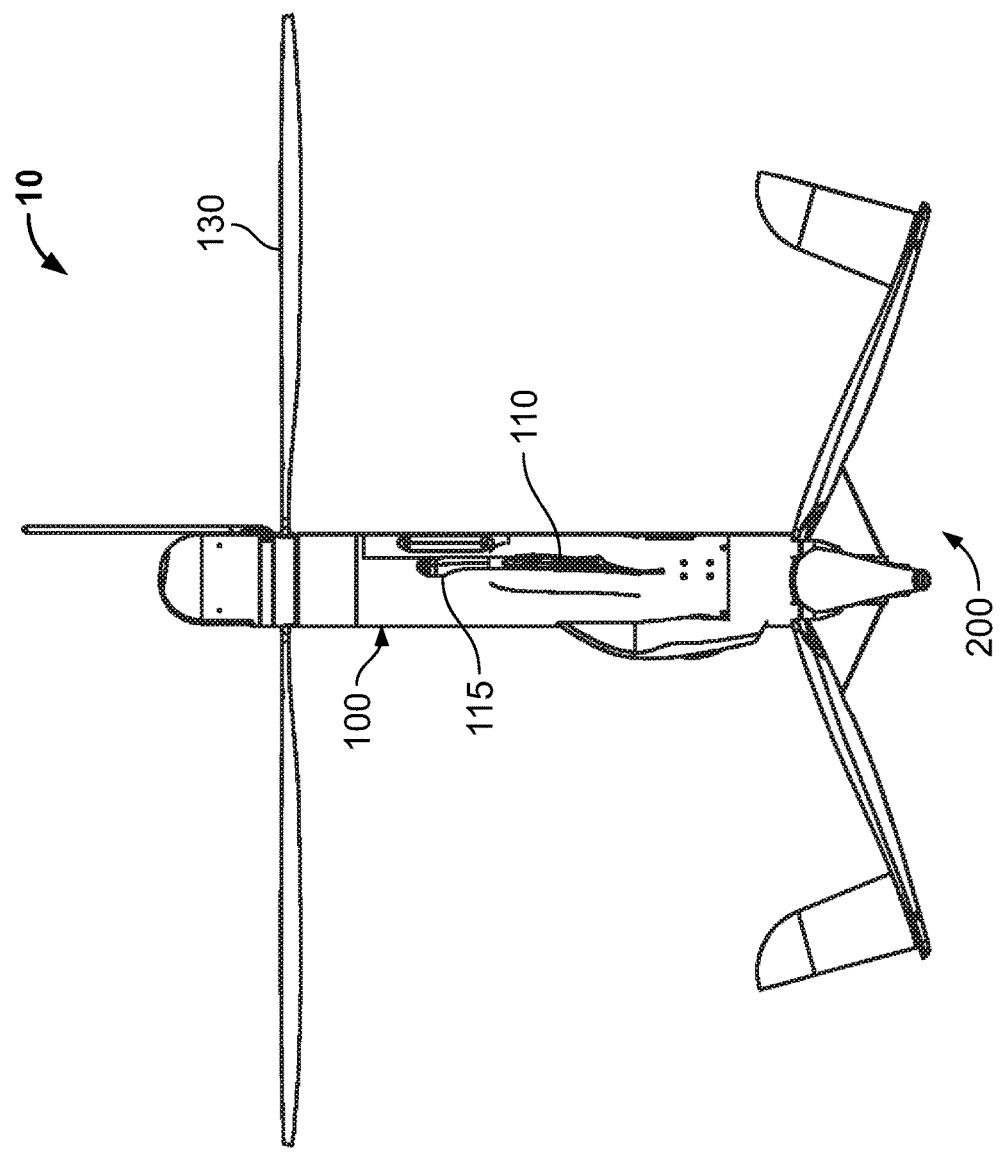
FIG. 2G shows a side elevational view of the tail-sitter aircraft of FIGS. 2A to 2D with its legs in the open configuration.

FIGS. 1A 1B, 1C, 1D, 1E, 1F, and 1G show one example embodiment of the tail-sitter aircraft 10 (sometimes referred to as the "aircraft" for brevity) with the legs in the closed configuration and forming the rear fuselage and empennage (or tail assembly) of the aircraft 10. FIGS. 2A, 2B, 2C, 2D, 2E, 2F, and 2G show the aircraft 10 with the legs in the open configuration and forming the landing gear of the aircraft 10.

In this example embodiment, the aircraft 10 includes: (1) a generally cylindrical fuselage 100 having a front end and a rear end; (2) a main rotor 130 rotatably attached to the fuselage 100 near the front end of the fuselage 100 that controls pitch and yaw of the aircraft 10 with rotor cyclic (similar to a conventional helicopter); (3) a first or right wing 110 attached to the fuselage 100 at one end, extending transversely from the fuselage 100, and terminating in a free end; (4) a second or left wing 120 attached to the fuselage 100 at one end opposite the first wing 110, extending transversely from the fuselage 100, and terminating in a free end; (5) first and second roll thrusters 115 and 125 attached to the respective free ends of the first and second wings 110 and 120 that facilitate control of the aircraft 10 in roll (i.e., control about the spin axis of the main rotor 130); and (6) a leg assembly 200 attached to the rear end of the fuselage 100.

FIGS. 3A, 3B, 3C, 3D, 3E, 3F, 3G, 3H, 3I, 3J, and 3K show the legged undercarriage or leg assembly 200 of this example embodiment of the aircraft 10. The leg assembly 200 includes a hub 205 and four elongated legs 210a, 210b, 210c, and 210d pivotably attached to the hub 205 via suitable connectors (not shown for clarity). Certain of the legs 210 include empennage surfaces that stabilize and control the aircraft 10 during wing-borne flight. Here, the first leg 210a includes a first fin 220a extending transversely therefrom, the third leg 210c includes a second fin 220c extending transversely therefrom, and the fourth leg 210d includes a tailplane 220d extending transversely therefrom.

The legs 210a, 210b, 210c, and 210d are sized, shaped, positioned, and pivotably connected to the hub 205 such that the legs 210a to 210d are movable from a closed configuration (best shown in FIGS. 1A to 1G) in which the legs 210a to 210d form the rear fuselage and empennage (or tail assembly) of the aircraft 10 to an open configuration (best shown in FIGS. 2A to 2G) in which the legs 210a to 210d form the landing gear of the aircraft 10 (and vice-versa). While this embodiment includes four legs, the aircraft could include any suitable quantity of legs, such as three legs.

Figure 3A:
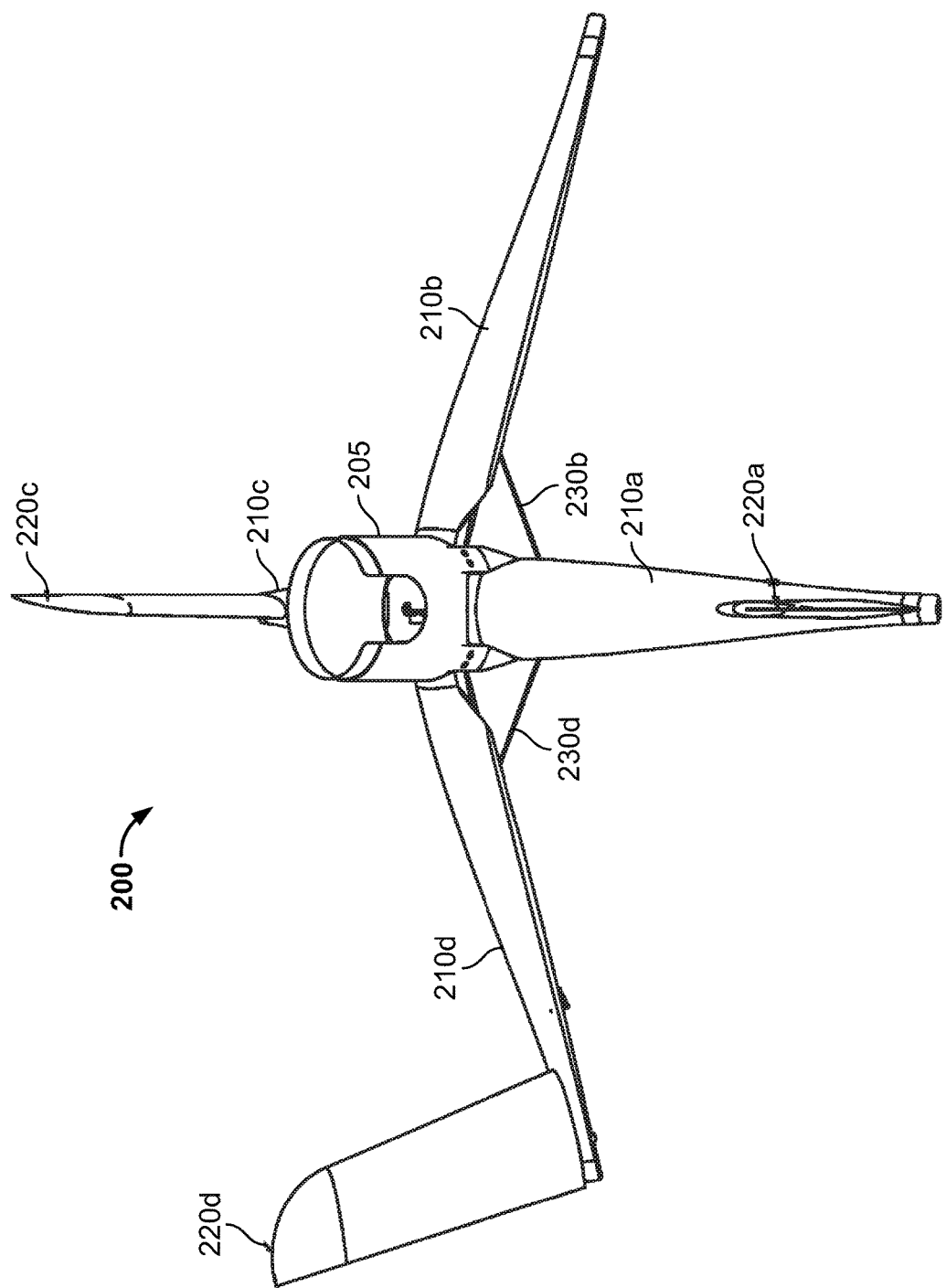
FIG. 3A shows a perspective view of the legged undercarriage or leg assembly of the tail-sitter aircraft of FIGS. 1A to 2G with its legs in the open configuration.
Figure 3B:
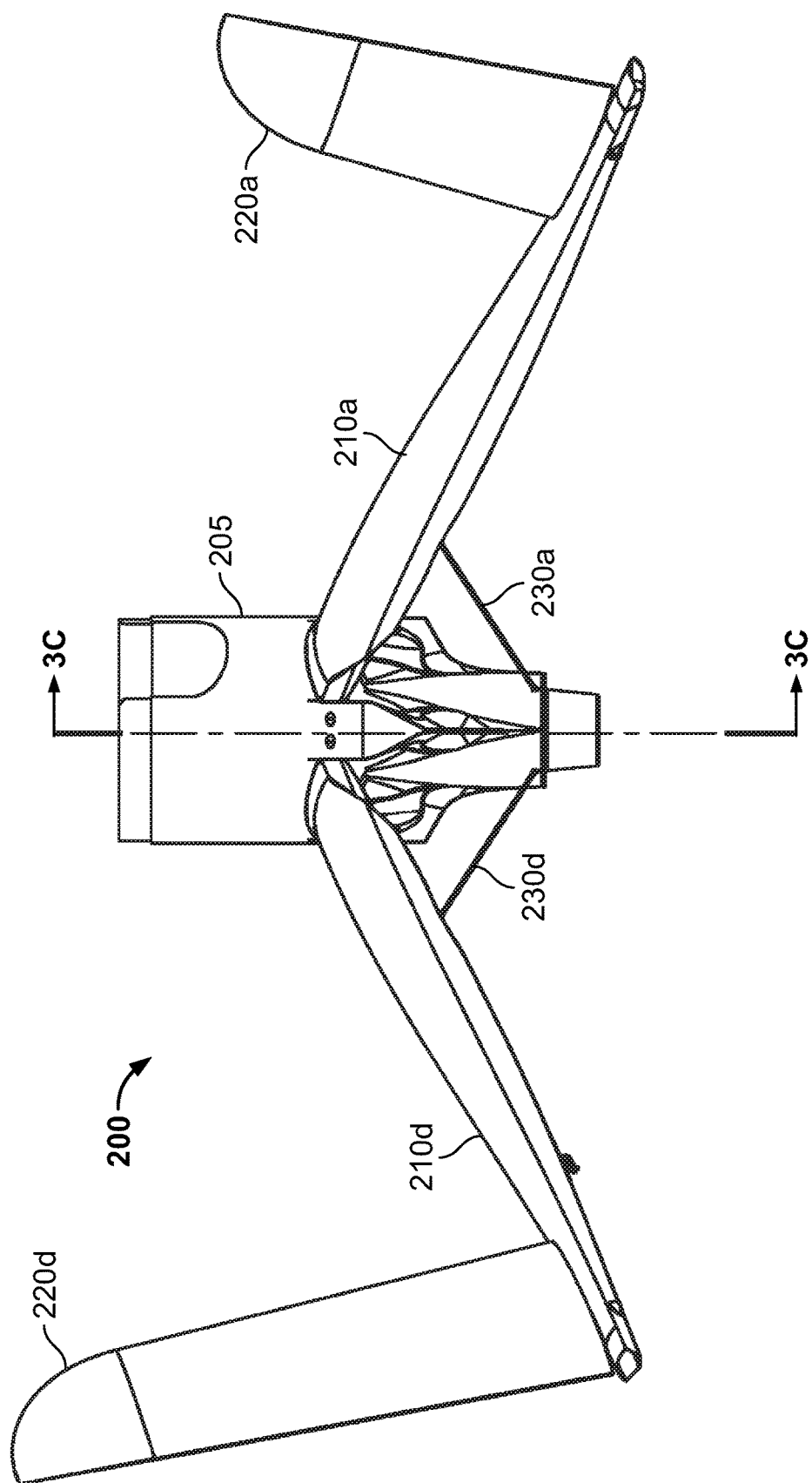
FIG. 3B shows a side elevational view of the leg assembly of FIG. 3A.
Figure 3C:
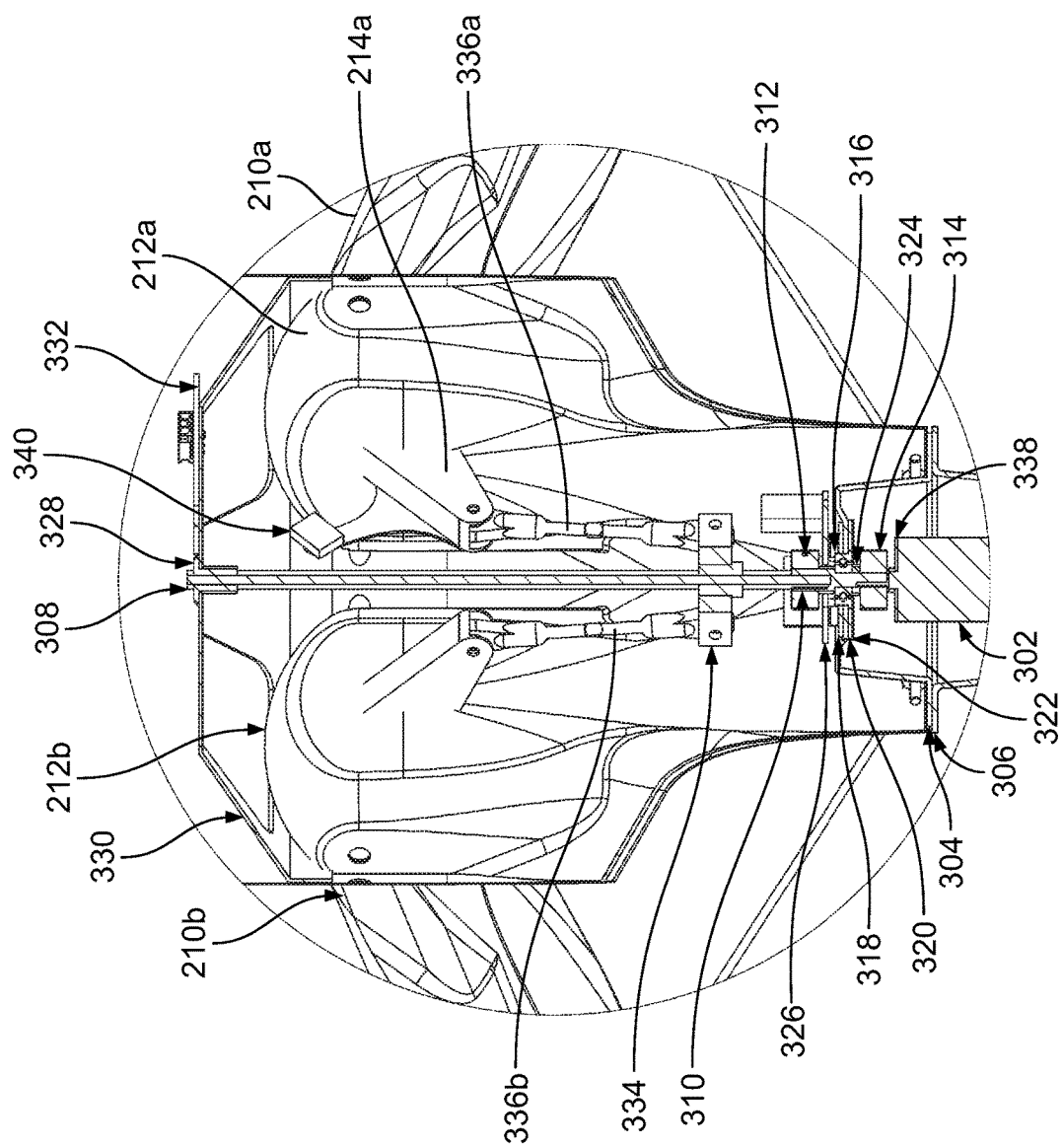
FIG. 3C shows an enlarged cross-sectional view of the leg assembly of FIG. 3A showing the interior of the hub taken substantially along the line 3C-3C of FIG. 3B.
Figure 3D:
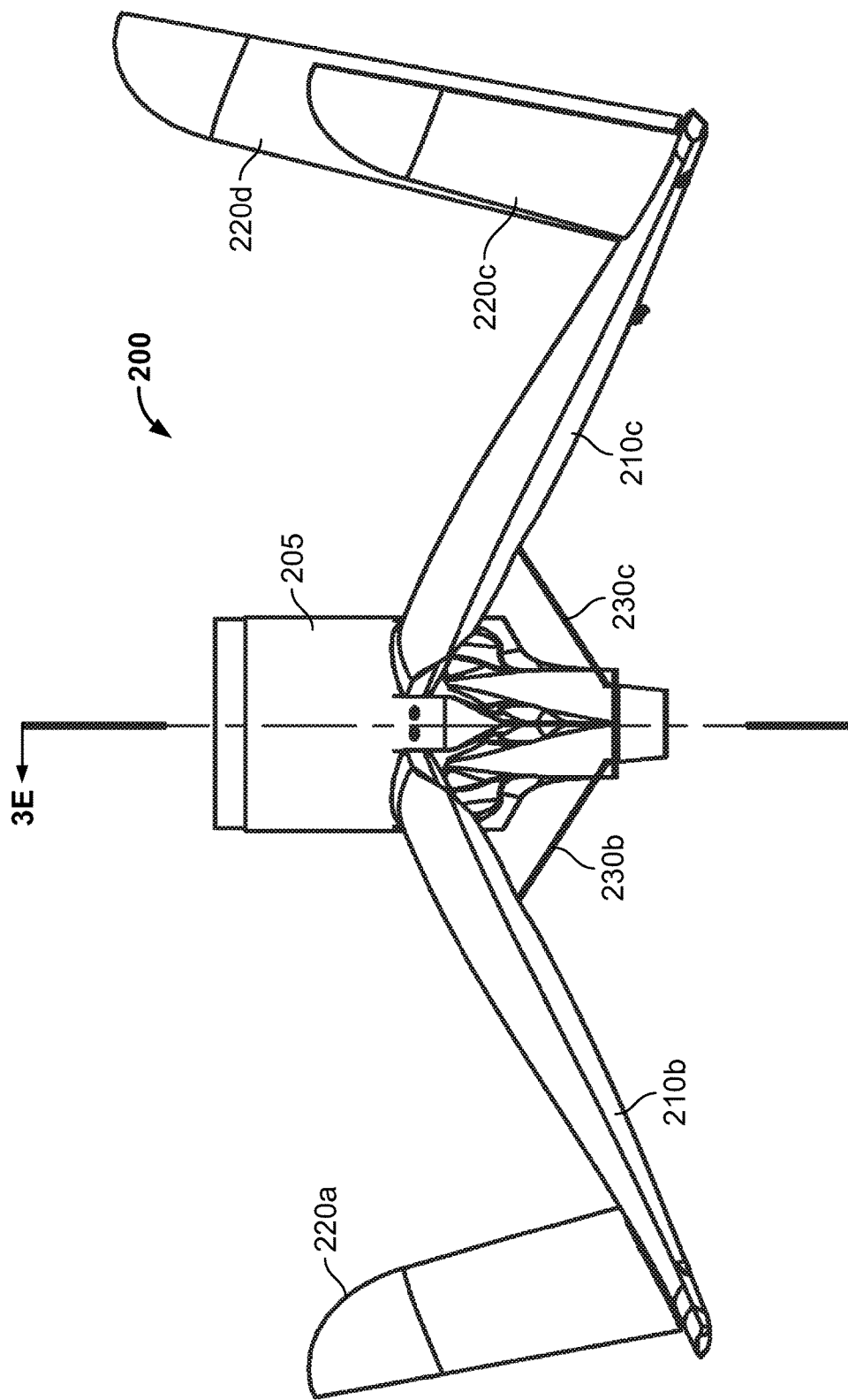
FIG. 3D shows another side elevational view of the leg assembly of FIG. 3A.
Figure 3E:
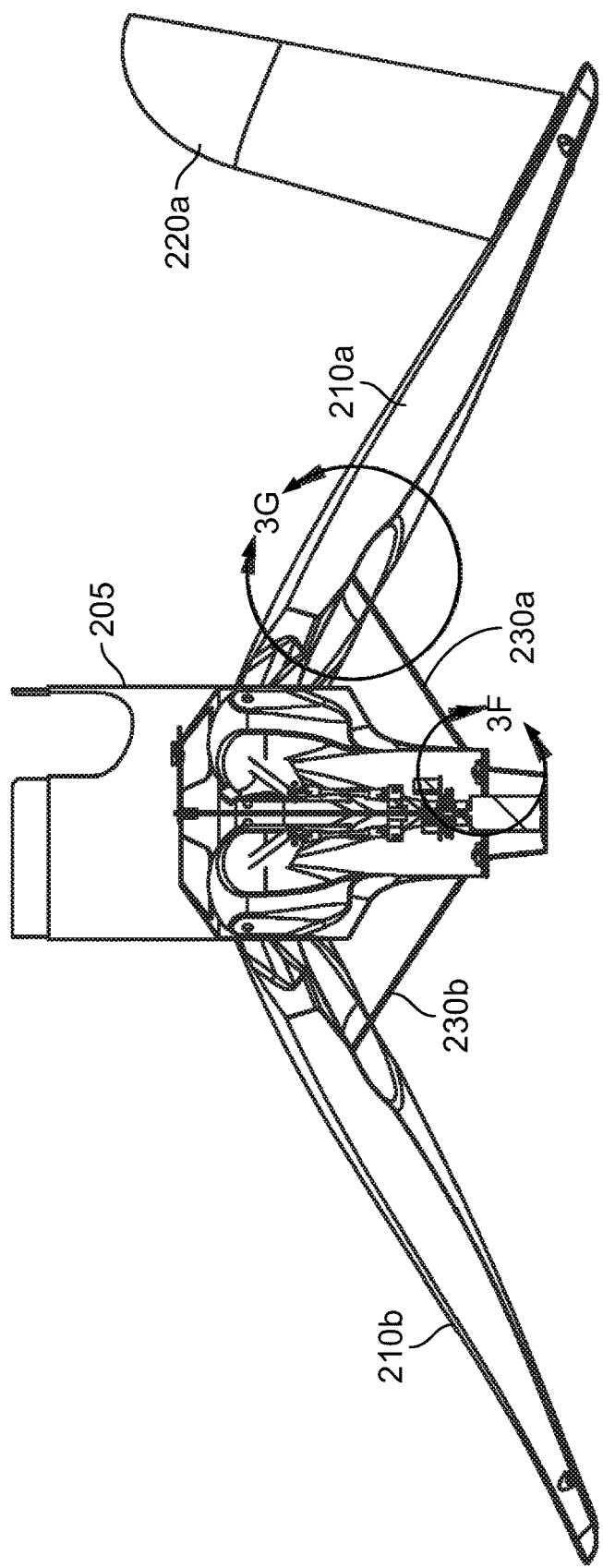
FIG. 3E shows a cross-sectional view of the leg assembly of FIG. 3A taken substantially along the line 3E-3E of FIG. 3D.

FIG. 3C shows certain of the elements included in this example embodiment of the aircraft 10 that operate to move the legs 210a to 210d from the closed configuration to the open configuration (and vice-versa). As noted above, this is one manner in which the aircraft is configured to move the legs from the closed configuration to the open configuration (and vice-versa), and the present disclosure contemplates any other suitable manner of doing so.

In this example embodiment, a motor 302 is disposed within a cavity formed by an upper motor housing 304 and a lower motor housing 306. The motor 302 is attached to the lower motor housing 306. The upper and lower motor housings 304 and 306 are attached to the hub 205 such that the lower motor housing 306 extends below the hub 205 while the upper motor housing 304 extends upward into the interior of the hub 205.

A motor shaft (not labeled) of the motor 302 is fixedly coupled to a lower end of a lead screw 308 via a coupler 310 and spaced-apart upper and lower collars 312 and 314 such that rotation of the motor shaft causes the lead screw 308 to rotate with the motor shaft. The coupler 310 passes through a bearing 314 retained in place between the upper and lower collars 312 and 314 by the upper motor housing 304; multiple bearing retainers 318, 320, and 322 (such as retaining rings); and a spacer 324. The coupler 310 also passes through a suitable opening defined through a lower printed circuit board 326. A bushing 328 fit into a cover 330 disposed within the hub 205 supports the upper end of the lead screw 308. An upper printed circuit board 332 is attached to the cover 330.

A leg-moving nut 334 is threadably disposed on the lead screw 308. A rigid link connects each leg to the leg-moving nut 334. Specifically: (1) a first rigid link 336a is attached at its lower end to the leg-moving nut 334 and pivotably attached at its upper end to a leg extension 214a extending transversely from a leg base 212a of the first leg 210a; (2) a second rigid link 336b is attached at its lower end to the leg-moving nut 334 and pivotably attached at its upper end to a leg extension 214b extending transversely from a leg base 212b of the second leg 210b; (3) a third rigid link (not shown) is attached at its lower end to the leg-moving nut 334 and pivotably attached at its upper end to a leg extension (not shown) extending transversely from a leg base (not shown) of the third leg 210c; and (4) a fourth rigid link (not shown) is attached at its lower end to the leg-moving nut 334 and pivotably attached at its upper end to a leg extension (not shown) extending transversely from a leg base (not shown) of the fourth leg 210d.

To move the legs 210a to 210d from the closed configuration to the open configuration, the motor 302 operates to rotate the motor shaft in a first rotational direction, which causes the lead screw 308 to rotate with the motor shaft in the first rotational direction. Rotation of the lead screw 308 in the first rotational direction causes the leg-moving nut 334 to move downward relative to the lead screw 308. This causes the rigid links 336 to pull downward on the respective leg extensions 214 of the legs 210 to which the rigid links 336 are attached. Since the legs 210 are pivotably attached to the hub 205, this pulling force causes each leg 210 to rotate about its pivotable attachment to the hub 205 such that the free end of that leg 210 moves radially-outward relative to the hub 205 and toward the front of the fuselage 100.

Conversely, to move the legs 210a to 210d from the open configuration to the closed configuration, the motor 302 operates to rotate the motor shaft in a second rotational direction opposite the first rotational direction, which causes the lead screw 308 to rotate with the motor shaft in the second rotational direction. Rotation of the lead screw 308 in the second rotational direction causes the leg-moving nut 334 to move upward relative to the lead screw 308. This causes the rigid links 336 to push upward on the respective leg extensions 214 of the legs 210 to which the rigid links 336 are attached. Since the legs 210 are pivotably attached to the hub 205, this pushing force causes each leg 210 to rotate about its pivotable attachment to the hub 205 such that the free end of that leg 210 moves radially-inward relative to the hub 205 and away from the front of the fuselage 100.

The aircraft 10 includes one or more suitable sensors configured to sense when the legs 210 have reached the closed configuration and/or the open configuration. In this example embodiment, the aircraft 10 includes a Hall effect sensor attached to the upper printed circuit board 332. The leg 210a includes a magnet 340 mounted to its leg base 212a within the hub 205 and positioned such that the Hall effect sensor detects the magnet 340 when the leg 210a is positioned in a manner corresponding to the legs 210 reaching the closed configuration.

Figure 3G:
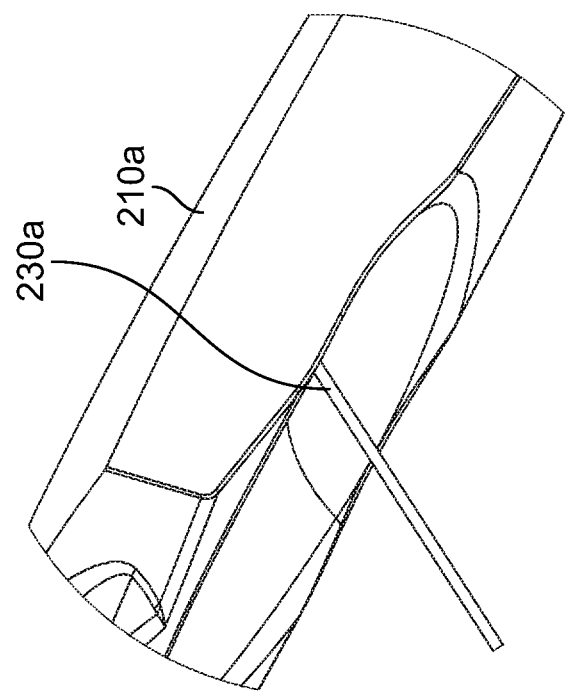
FIG. 3G shows an enlarged view of the portion of the leg assembly of FIG. 3A encircled by the circle 3G-3G of FIG. 3E.
Figure 3F:
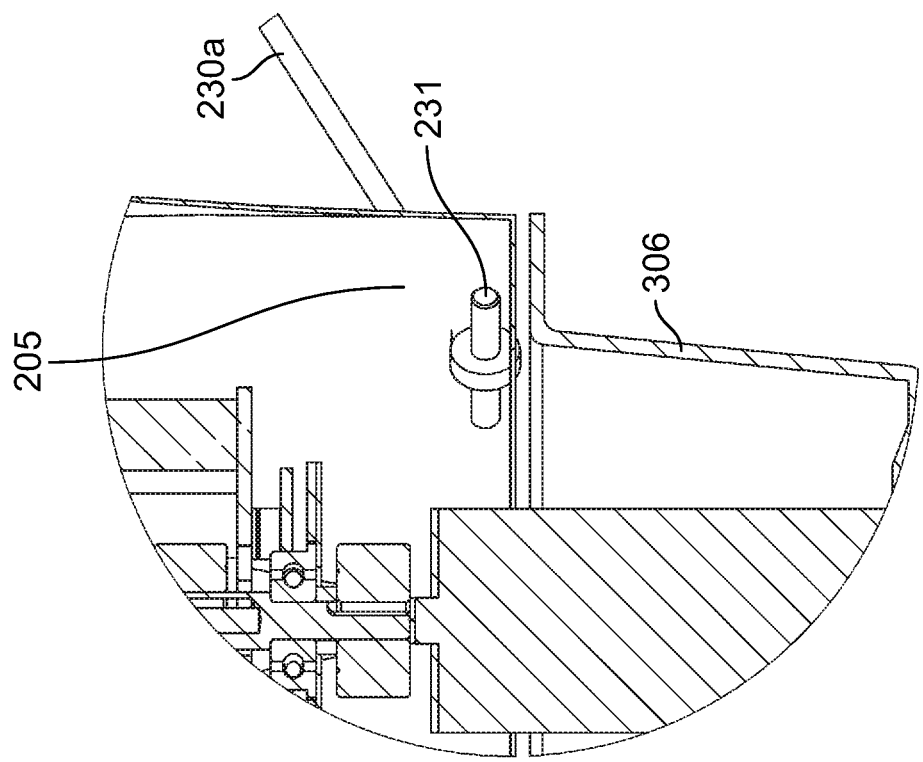
FIG. 3F shows an enlarged cross-sectional view of the portion of the leg assembly of FIG. 3A encircled by the circle 3F-3F of FIG. 3E.
Figure 3H:
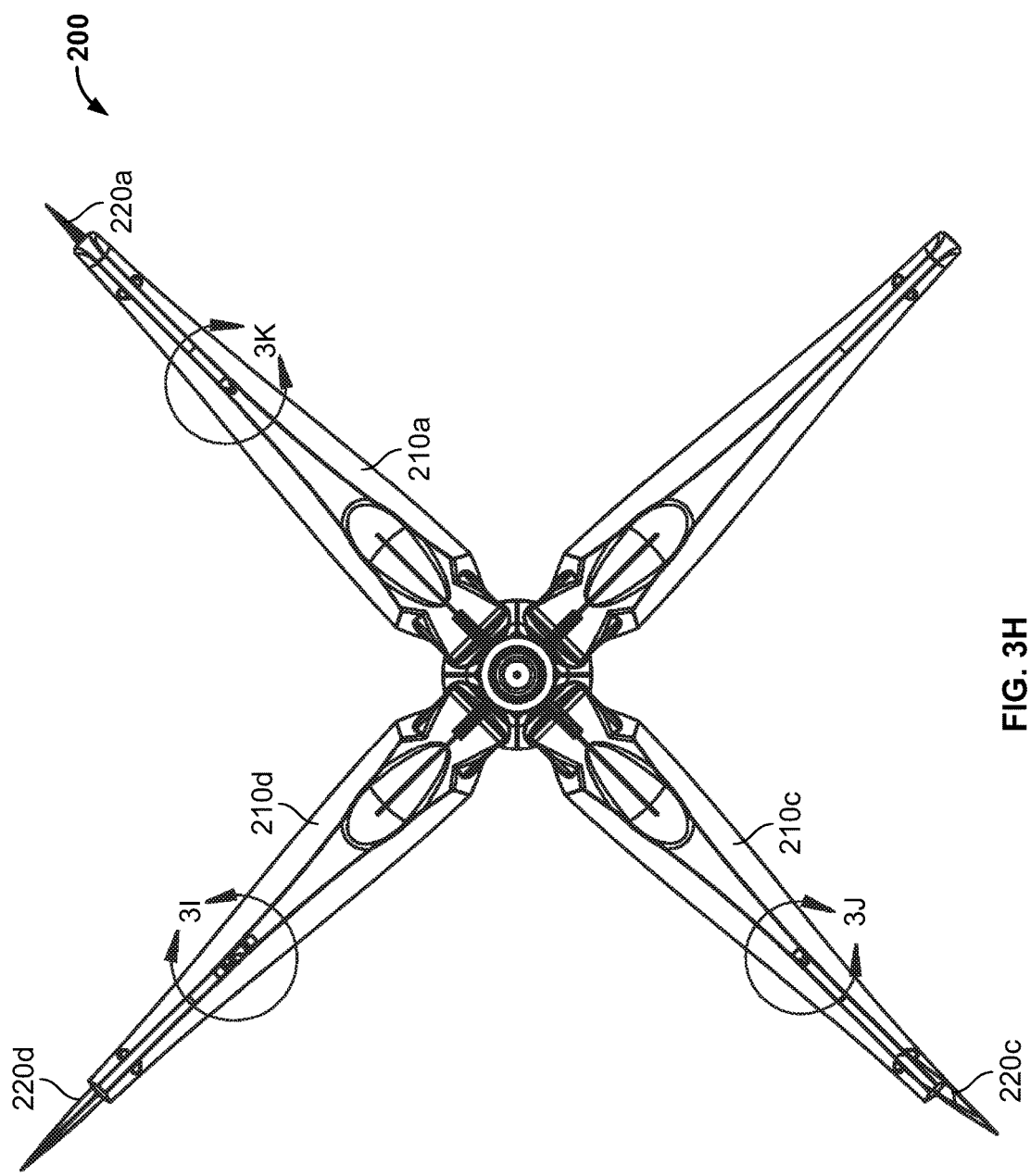
FIG. 3H shows a bottom plan view of the leg assembly of FIG. 3A.

The aircraft 10 includes multiple flexible stabilizers 230 that help prevent the legs 210 from over-rotating once in the open configuration and that transfer to the hub 205 part of certain loads applied to the legs 210 when in the open configuration. This reduces certain stresses imposed on the legs 210. FIGS. 3F and 3G show the stabilizer 230a of the first leg 210a. The stabilizers of the other legs are similar. One end of the stabilizer 230a is retained inside the hub 205 via a suitable retaining element (such as a pin 231a) and the other end of the stabilizer 230a is retained inside a cavity formed in the leg 210a via a suitable retaining element (not shown). When the legs 210 are in the open configuration, the stabilizers 230 transfer loads applied on the respective legs 210 that tend to cause the free ends of the legs 210 to rotate radially-outward relative to the fuselage 100 and toward the front end of the fuselage 100 to the hub 205 while preventing the legs 210 from over-rotating. While the legs 210 move from the open configuration to the closed configuration, the stabilizers slide into the cavities formed within their respective legs 210 (though not so in other embodiments).

Figure 3K:
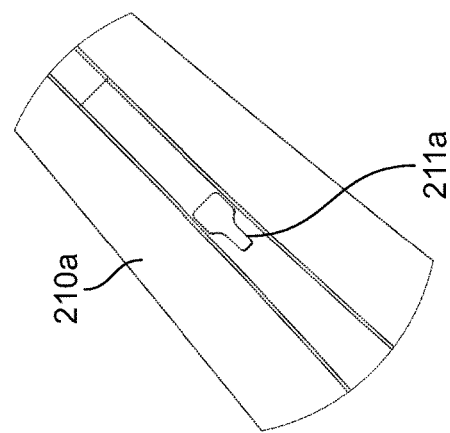
FIG. 3K shows an enlarged view of the portion of the leg assembly of FIG. 3A encircled by the circle 3K-3K of FIG. 3H.
Figure 3I:
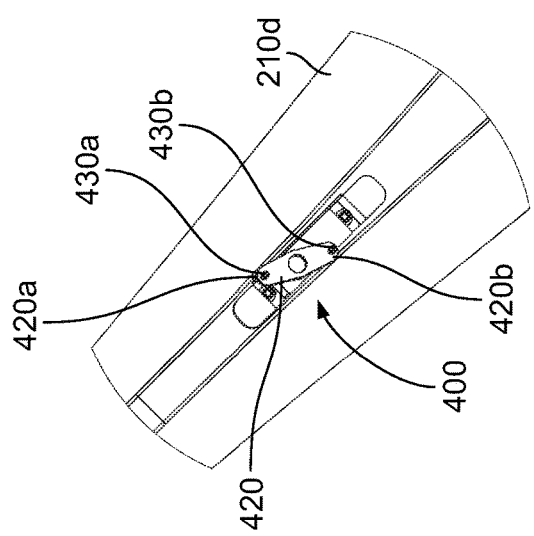
FIG. 3I shows an enlarged view of the portion of the leg assembly of FIG. 3A encircled by the circle 3I-3I of FIG. 3H.
Figure 3J:
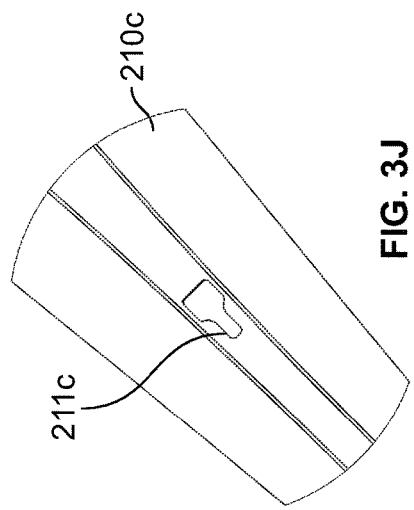
FIG. 3J shows an enlarged view of the portion of the leg assembly of FIG. 3A encircled by the circle 3J-3J of FIG. 3H.

As best shown in FIGS. 3I, 3J, and 3K, the aircraft 10 includes a lock device 400 usable to lock the legs 210a, 210c, and 210d together when the legs 210 are in the closed configuration. In this example embodiment, the lock device 400 is mounted to the underside of the leg 210d and includes a lock motor (such as a servo motor, not shown), a motor shaft 410, a head 420 fixedly attached to the motor shaft 410 and having a first end 420a and an opposing second end

420*b,* and first and second locking tabs 430*a* and 430*b* extending from the first and second ends 420*a* and 420*b*. The head 420 is rotatable via the motor shaft 410 of the motor from a disengaged position in which the head is generally parallel to a longitudinal axis of the leg 210*d* to an engaged position in which the head is generally transverse (such as generally perpendicular) to the longitudinal axis of the leg 210*d*.

The undersides of the legs 210*a* and 210*c* each define locking openings 211*a* and 211*c* therethrough. To lock the legs 210*a,* 210*c,* and 210*d* together, once the legs 210 are in the closed configuration, the lock motor is operated to cause the motor shaft 410 to rotate the head 420 from the disengaged position to the engaged position. As the head 420 begins rotating from the disengaged position to the engaged position: (1) a wide portion of the locking opening 211*a* defined in the underside of the leg 210*a* receives the first end 420*a* of the head 420, and (2) a wide portion of the locking opening 211*c* defined in the underside of the leg 210*c* receives the second end 420*b* of the head 420. As the head 420 finishes rotating to the engaged position: (1) a narrow portion of the locking opening 211*a* receives the head 420 such that the first end 420*a* and the first locking tab 430*a* are disposed within the leg 210*a*, and (2) a narrow portion of the locking opening 211*c* receives the head 420 such that the second end 420*b* and the second locking tab 430*b* are disposed within the leg 210*c*.

Since the narrow portions of the openings 211*a* and 211*c* are slightly larger than the thickness of the head 420, the locking tabs 430*a* and 430*b* respectively disposed within the legs 210*a* and 210*c* prevent the legs 210*a* and 210*c* from separating from one another, thereby locking the legs 210*a,* 210*c,* and 210*d* together. Reversing the above process unlocks the legs 210*a,* 210*c,* and 210*d* from one another.

2. Launching and Landing Methods

The aircraft 10 takes-off with its legs 210 deployed such that the aircraft 10 rests nose-up on the launch pad. The legs 210 and the lower motor mount 306 stabilize the aircraft 10 in this orientation. Once the aircraft 10 climbs to sufficient altitude, the legs 210 are folded into the closed configuration and locked. The aircraft 10 can then proceed into wing-borne flight.

To land, the aircraft 10 transitions from wing-borne flight to thrust-borne flight and descends to its landing point. At an appropriate point on the approach, the legs 210 are unlocked and opened to the open configuration for landing. The aircraft 10 then descends until the legs 210 and the lower motor mount 306 contact a suitable landing surface, such as the deck of a ship at sea, at which point the engine is shut down and the aircraft 10 is stably at rest.

While the features, methods, devices, and systems described herein may be embodied in various forms, there are shown in the drawings, and will hereinafter be described, some exemplary and non-limiting embodiments. Not all of the depicted components described in this disclosure may be required, however, and some implementations may include additional, different, or fewer components from those expressly described in this disclosure. Variations in the arrangement and type of the components; the shapes, sizes, and materials of the components; and the manners of attachment and connections of the components may be made without departing from the spirit or scope of the claims as set forth herein. This specification is intended to be taken as a whole and interpreted in accordance with the principles of the invention as taught herein and understood by one of ordinary skill in the art.

Various changes and modifications to the presently preferred embodiments described herein will be apparent to those skilled in the art. These changes and modifications can be made without departing from the spirit and scope of the present subject matter and without diminishing its intended advantages. It is intended that such changes and modifications be covered by the appended claims.

The invention is claimed as follows:

1. An aircraft comprising:
a fuselage;
multiple wings each attached to and extending transversely from the fuselage; and
multiple legs movable from a closed configuration in which legs form a tail assembly to an open configuration in which the legs at least partially form landing gear.

2. The aircraft of claim 1, wherein the tail assembly includes a rear fuselage and empennage.

3. The aircraft of claim 1, wherein each leg is pivotable relative to the fuselage.

4. The aircraft of claim 3, wherein each leg terminates in a free end.

5. The aircraft of claim 4, wherein the free ends of the legs move radially-outward relative to the fuselage when moving from the closed configuration to the open configuration.

6. The aircraft of claim 5, wherein the free ends of the legs move radially-inward relative to the fuselage when moving from the open configuration to the closed configuration.

7. The aircraft of claim 6, wherein the free ends of the legs move toward a front end of the fuselage when moving from the closed configuration to the open configuration and away from the front end of the fuselage when moving from the open configuration to the closed configuration.

8. The aircraft of claim 4, which includes a motor operably coupled to the legs to move the legs between the closed configuration and the open configuration.

9. The aircraft of claim 8, wherein the motor is operable in a first rotational direction to move the legs from the closed configuration to the open configuration and in a second opposite rotational direction to move the legs from the open configuration to the closed configuration.

10. The aircraft of claim 1, which includes a locking device movable to lock at least two of the legs together when in the closed configuration.

11. The aircraft of claim 10, wherein at least two of the legs include aerodynamic aircraft control surfaces.

12. The aircraft of claim 11, wherein the locking device is movable to lock the at least two of the legs including stabilizing surfaces together when the at least two of the legs are in the closed configuration.

13. The aircraft of claim 1, which includes a flexible stabilizer connecting one of the legs to the fuselage.

14. A method of launching an aircraft, said method comprising:
after multiple legs of the aircraft are in an open configuration and at least partially support the aircraft, controlling the aircraft to climb in thrust-borne flight; and
afterwards, controlling the legs to move to a closed configuration to form a tail assembly of the aircraft.

15. The method of claim 14, which includes controlling the aircraft to transition to wing-borne flight after the legs reach the closed configuration.

16. The method of claim 14, which includes locking at least two of the legs together after reaching the closed configuration.

17. The method of claim 14, which includes controlling the legs to move to the closed configuration after the aircraft reaches a designated altitude.

18. A method of landing an aircraft, said method comprising:
controlling the aircraft to descend in thrust-borne flight;
afterward, controlling multiple legs of the aircraft to move from a closed configuration in which the legs form a tail assembly of the aircraft to an open configuration; and
controlling the aircraft to descend until the legs contact a landing surface.

19. The method of claim 18, which includes unlocking at least two of the legs from one another before moving the legs to the open configuration.

20. The method of claim 18, which includes controlling the legs to move from the closed configuration to the open configuration after the aircraft descends below a designated altitude.

\* \* \* \* \*